Nov. 10, 1964 L. NAMENYI-KATZ 3,156,424
MAGNETIC TAPE DECKS
Filed Aug. 23, 1962
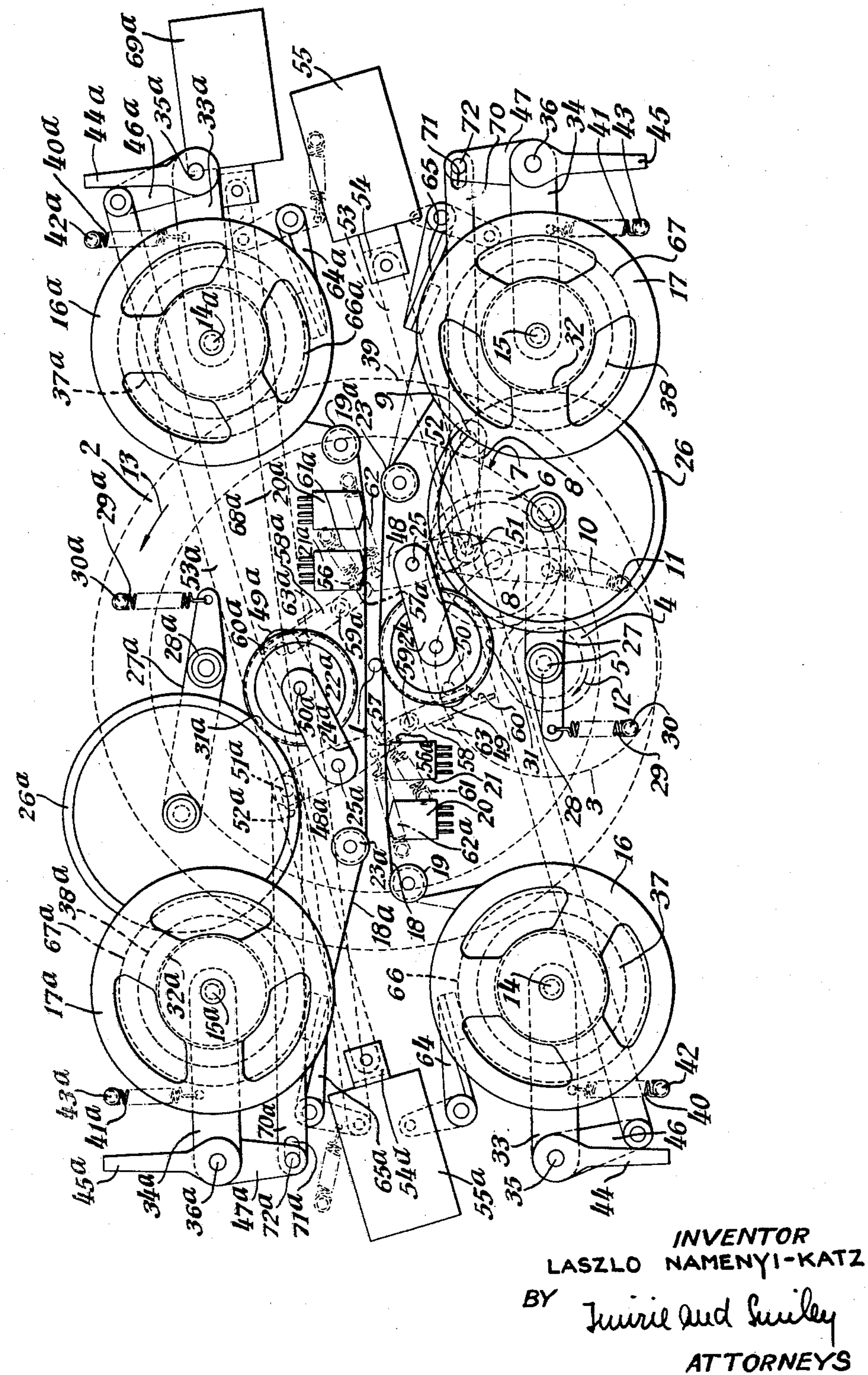
INVENTOR
LASZLO NAMENYI-KATZ
BY Imirie and Smiley
ATTORNEYS United States Patent Office 3,156,424
Patented Nov. 10, 1964

3,156,424
MAGNETIC TAPE DECKS

Laszlo Namenyi-Katz, Roehampton, London, England, assignor to Vectron Electro-Physics Limited, Bedfont, England Filed Aug. 23, 1962, Ser. No. 219,058
Claims priority, application Great Britain Aug. 25, 1961
20 Claims. (Cl. 242—55.12)

This invention relates to tape decks for magnetic tape recorders in which, for making a magnetic tape recording or for playing back such a recording, a magnetic tape is moved by a driving device at constant speed past one or more electromagnetic transducer (recording and/or playback) heads.

An object of the invention is to provide a tape deck which affords facilities for virtually continuous and uninterrupted recording or playback.

A further object is to provide a tape deck whereby recording or playback may be effected with one tape while another tape may be undergoing a fast winding operation on the same deck.

Another object is to provide a tape deck whereby two separate magnetic tapes may be driven simultaneously at an identical and constant tape speed. Such arrangement is advantageous for copying a magnetic recording from one tape to another.

More particularly it is an object of the invention to provide a tape deck having two tape paths and a common drive for driving two separate magnetic tapes at a constant tape speed for recording or playback, and mechanism operable selectively for driving the tapes at a constant tape speed, alternatively or simultaneously at will. A further object is to provide such a tape deck also with facilities for fast wind of each tape without interruption of the operation of the other tape.

The invention provides a tape recorder with virtually continuous recording and playback facilities. A reel of tape may be recorded or played back and when this has completed its run recording or playback may be switched to a second reel of tape and during the operation of this second reel the first used tape can undergo a fast rewind operation and since this will be completed before completion of the run of the second tape the rewound used reel can be replaced, while the second tape is in operation, by a further reel in readiness for recording or playback to be switched thereto when the operating tape has completed its run, and so on.

A tape deck incorporating the invention may be organised for translating magnetic tape on reels from reel to reel or for translating magnetic tape in the form of endless loops, in either case at an identical and constant tape speed for recording or playback.

With the foregoing in view the various features of the invention consist of the novel features of construction, combinations and organisations of parts and mechanisms hereinafter described and claimed, the foregoing and other advantages of which will be apparent to those skilled in the art from the following description with reference to the accompanying drawing of one form of tape deck which may be constructed in accordance with the invention. The invention is not limited to the precise mechanisms herein described except as required by the scope of the appended claims.

The accompanying drawing illustrates in plan view a preferred form of tape deck according to this invention.

The tape deck mechanism illustrated includes a capstan 1 mounted on the shaft of a flywheel 2 which is driven by an electric motor 3 through a friction drive wheel 4 fixed on the motor shaft 5 and having its rim in frictional driving engagement with the rim of an idler friction wheel 6 the rim of which is in frictional driving engagement with an inner rim 7 of the flywheel 2. The idler wheel 6 is carried by an angle arm 8 which is pivoted at one end on a pivot pin 9 and is attached at its other end to a tension spring 10 which is anchored to a post 11 and holds the rim of idler wheel 6 in contact with the drive wheel 4 and the rim 7 of the flywheel 2. The arrow 12 denotes the direction of drive of the motor and drive wheel 4, consequently the flywheel 2 and capstan 1 will be driven in the opposite direction denoted by the arrow 13.

Two tape paths are provided on the deck. Necessarily for this purpose certain parts of the deck equipment are duplicated and function similarly for each tape path. Accordingly, for convenience of illustration and description corresponding and similarly functioning parts are denoted by the same reference numerals, those parts for one tape path being distinguished from corresponding parts for the other path by the suffix "*a*."

The deck is provided with a pair of spindles 14 and 15 for receiving tape reels 16 and 17 for one tape path, and with a pair of spindles **14*a* and 15*a* for receiving tape reels 16*a* and 17*a* for the other tape path. In recording and playback, a magnetic tape 18 is unwound from feed reel 16 over guide roller 19, past an electromagnetic erase head 20 and an electromagnetic transducer (record/playback) head 21, between the capstan 1 and a pinch roller 22, over guide roller 23 and is wound on take-up reel 17. Likewise for the other tape path a magnetic tape 18*a* passes from feed reel 16*a* over guide roller 19*a*, electromagnetic heads 20*a* and 21*a*, between capstan 1 and pinch roller 22*a*, over guide roller 23*a* to take-up reel 17*a*. In recording and playback, the tape will pass over the electromagnetic heads 20, 21 or 20*a*, 21*a* in the respective tape path before passing the capstan 1**.

Each pinch roller 22 or **22*a* is mounted on a carrier arm 24 or 24*a* pivotable on a pivot 25 or 25*a* so that the pinch roller can be shifted into and out of engagement with the capstan 1. The pinch rollers engage the capstan substantially at opposite ends of a diameter thereof, so that the pinch rollers will be driven by the capstan in opposite directions. Thus, with the capstan rotating in the direction of the arrow 13, it will drive the pinch roller 22 clockwise and the pinch roller 22*a* anti-clockwise as viewed in the drawing, such drive being required in recording and playback, when a magnetic tape 18 or 18*a* which is being recorded or played back is pressed by the respective pinch roller against the capstan 1 and is moved by the capstan past the transducer head 21 or 21*a*** at a constant tape speed.

As shown, the pinch rollers are made substantially larger in diameter than the capstan. The pinch rollers serve also for driving the respective take-up reels 17 and **17*a*, on recording and playback, through an idler friction wheel 26 or 26*a* carried on an arm 27 or 27*a* which is pivoted on a pivot 28 or 28*a* and is attached to a tension spring 29 or 29*a* anchored to a post 30 or 30*a*, this spring holding the idler wheel in contact with a driving surface 31 or 31*a* of the pinch roller. The take-up spindle 15 or 15*a* has a friction wheel 32 or 32*a* which is driven by the idler 26 or 26*a* being being moved by its spring 29 or 29*a* into driving contact with the wheel 32 or 32*a* when the pinch roller, against which the idler is being urged by its spring, is moved to engage the capstan 1. The drawing shows the pinch roller 22 in that engaged position. Accordingly, as pinch roller 22 is rotated (clockwise in the drawing) by the capstan, the pinch roller drives the take-up spindle 15 through wheels 26 and 32, as shown. When the pinch roller is withdrawn from the capstan, and thus is no longer driven by the capstan, the withdrawal of the pinch roller withdraws the idler wheel against the action of its spring and the drive to the take-up spindle is stopped. The drawing shows the pinch roller 22*a*** in that withdrawn position and it will be seen that it holds the idler wheel 26a out of engagement with the driven wheel 32a on the take-up spindle 15a against the action of the spring 29a of the idler wheel.

The spindles 14, 15, 14a, 15a are similarly carried by rocker arms 33, 34, 33a, 34a pivoted on pivots 35, 36, 35a, 36a respectively, and these spindles are similarly provided with friction wheels 37, 38, 37a, 38a respectively, positioned opposite the outer rim 39 of the flywheel 2. The rocker arms are provided with tension springs 40, 41, 40a, 41a attached to anchorages 42, 43, 42a, 43a respectively. Each rocker arm is turnable against the action of its spring from a normal position (as shown in the case of arms 33, 34 and 34a) to a position (as shown in the case of arm 33a) in which the relative friction wheel 37, 38, 37a or 38a is brought into contact with the flywheel rim 39. By this means the spindles may selectively be driven by the flywheel 2 at a high speed, as required for fast tape winding and rewinding operations. The rocker arms are provided respectively with actuating arms 44, 45, 44a, 45a which may be arranged for manual operation by push buttons or other convenient operating means (not shown) in order to turn the rocker arms, these returning under their spring action on release of the operating means. The rocker arms are also provided with arms 46, 47, 46a, 47a respectively which are connected with actuating mechanism for the pinch rollers, for purposes to be mentioned later.

The actuating mechanism for the pinch rollers will now be described. The carrier arm 24 or 24a of each pinch roller is fixed with respect to a two-armed actuating lever 48 or 48a pivoted on pivot 25 or 25a, and the carrier arm is also fixed with respect to an arm 49 or 49a which extends in the opposite direction to the carrier arm and which is provided at its outer end with a latch pin 50 or 50a which can be received and held in a detent 60 or 60a at one end of a pivoted latch lever 58 or 58a. The actuating lever 48 or 48a has at one end a pin 51 or 51a positioned in a longitudinal slot 52 or 52a in a connecting rod 53 or 53a attached at one end to the armature 54 or 54a of a solenoid 55 or 55a, the other end of the connecting rod being attached to the arm 46 or 46a. The actuating lever 48 for pinch roller 22 also actuates the latch 58a of the other pinch roller 22a, and similarly the actuating lever 48a for pinch roller 22a also actuates latch 58 of pinch roller 22. For this purpose each actuating lever is provided at its other end with a nose 56 or 56a for engaging a pin 57a or 57 on the other end of latch lever 58a or 58. The latch levers 58, 58a are two-armed levers pivoted respectively on pivots 59, 59a and attached to tension springs 61, 61a respectively, which tend to turn the latch levers anti-clockwise as viewed in the drawing and thus keep them bearing against the latch pins 50, 50a. The actuating levers 48, 48a are attached to tension springs 62, 62a respectively, which tend to turn the actuating levers clockwise as viewed in the drawing and thus move the pinch rollers into engagement with the capstan 1. The spring 62 or 62a comes into action for engaging the associated pinch roller 22 or 22a with the capstan when the pinch roller is unlatched by withdrawal of its latch lever 58 or 58a to release the latch pin 50 or 50a from the latching detent 60 or 60a. In the drawing pinch roller 22 is shown unlatched and in contact with the capstan 1, while pinch roller 22 is shown withdrawn from the capstan and latched.

The actuating levers 48, 48a are operated by the solenoids 55, 55a through the pin-and-slot connections 51, 52 and 51a, 52a. The solenoid 55, when energised, operates actuating lever 48 to cause the latter to withdraw pinch roller 22 from engagement with the capstan 1 and at the same time to operate latch 58a and release latch pin 50a for allowing pinch roller 22a to engage the capstan. Similarly, solenoid 55a when energised operates actuating lever 48a to disengage pinch roller 22a from the capstan and at the same time unlatch pinch roller 22 and allow it to engage the capstan. As will be seen from the drawing, when a pinch roller is unlatched and the associated solenoid is de-energised (as shown in the case of pinch roller 22 and solenoid 55) the pin (51) on the actuating lever (48) is at the end of the slot (52) in the connecting rod (53) remote from the solenoid armature (54). Thus, the pin is in position in the slot for the connecting rod to operate the actuating lever for disengaging the pinch roller from the capstan on energising the solenoid. Also, as is shown in the case of pinch roller 22a, when a pinch roller is in latched position the pin (51a) of the actuating lever (48a) is at the end of the slot (52a) in the connecting rod (53a) remote from the solenoid armature (54a) if the solenoid (55a) is energised (as shown), and is at the other end of the slot if the solenoid is de-energised.

The described arrangement of interacting actuating levers 48, 48a and latch levers 58, 58a provides for simultaneous actuation of the two pinch rollers 22, 22a by means of the solenoids 55, 55a so that while one pinch roller is engaged with the capstan the other is automatically disengaged, movement of one pinch roller from its engaged to its disengaged position by means of its associated solenoid automatically causing simultaneous release of the other pinch roller allowing it to move from its disengaged to its engaged position. Thus, the pinch rollers are driven from the capstan alternatively, which allows one tape path to be used for recording or playback while the other tape path is being used for a fast rewind operation.

Although the arrangement effects alternative driving of the pinch rollers from the capstan, with the mechanism described it is easy to provide also, if desired, the facility of simultaneous drive of both pinch rollers from the capstan, thus enabling the tape deck to be used also for copying a recording from one tape on to another tape. For this purpose all that is required is a provision, independent of the solenoids controlling the actuating levers 48, 48a, of a means whereby whichever pinch roller is in latched position can be unlatched to allow it to engage the capstan under the action of the spring 62 or 62a. Accordingly, the latch levers 58, 58a may be provided with actuating arms 63, 63a respectively, which may be arranged for manual operation by push buttons or other convenient operating means (not shown) in order to turn the latch levers against the action of their springs 61, 61a for unlatching, the latch levers returning under their spring action on release of the operating means. Thus, for example in the case of the pinch roller 22a shown latched, its latch 58a may be released by operation of the actuating arm 63a in order to enable that pinch roller as well as pinch roller 22 to be driven by the capstan when a simultaneous drive of both pinch rollers is required.

The spindles 14, 15, 14a, 15a are similarly provided with brakes 64, 65, 64a, 65a disposed for engagement with brake drum surfaces 66, 67, 66a, 67a provided on the spindles respectively. The brakes 64, 65 are coupled together for operation by a brake solenoid, and similarly in the case of brakes 64a and 65a. The drawing shows a coupling 68a and brake solenoid 69a only in the case of the brakes 64a and 65a.

The drawing shows the disposition of the parts of the tape deck mechanism assuming that the tape 18a has completed a recording or playback and is about to be rewound from take-up reel 17a to reel 16a, and that the solenoid 55a has been energised to cause actuating lever 48a to withdraw pinch roller 22a from the capstan 1 into position where it is latched by latch lever 58a, the actuating lever 48a at the same time having operated latch lever 58 of pinch roller 22 to release the latter into engagement with the capstan 1.

Accordingly, in this disposition of the parts as shown, the pinch roller 22 engaging the capstan 1 is causing the tape 18 to be driven by the capstan at a constant tape speed for recording or playback and the pinch roller 22 is driving the take-up reel 17 on spindle 15. The feed reel 16 is being turned by the unwinding tape 18. The solenoid 55 is de-energised but solenoid 55*a* is shown as still being energised. In that condition the armature 54*a* is held attracted, the connecting rod 53*a* accordingly being in the position shown in which the pin 51*a* is at the right hand end of the slot 52*a* as viewed in the drawing and the connecting rod has turned the rocker arm 33*a* to engage the friction wheel 37*a* on spindle 14*a* with the rim 39 of the flywheel 2, thus causing reel 16*a* to be turned at high speed clockwise as viewed in the drawing, for fast rewinding of tape 18*a* on that reel. This rewinding operation, being at a much faster speed than that of the tape 18 being recorded or played back, will be completed while the recording or playback of tape 18 is still proceeding. When the rewinding of tape 18*a* is completed the solenoid 55*a* is de-energised, thus allowing the spring 40*a* to return the rocker arm 33*a* and remove the wheel 37*a* of spindle 14*a* from contact with the flywheel 2. The return movement of the connecting rod 53*a* positions the pin 51*a* at the other end of the slot 52*a*. On de-energising the solenoid 55*a* the brakes 64*a*, 65*a* are applied.

The rewound reel may then be replaced by a fresh reel of tape and the fresh tape threaded therefrom over guide roller 19*a*, heads 20*a*, 21*a*, capstan 1 and guide roller 23*a* to take-up reel 17*a* in readiness for record or playback when the operation of tape 18 has been completed.

On completion of recording or playback on tape 18 the solenoid 55 is energised, drawing the connecting rod 53 towards the right as viewed in the drawing. The pin 51 being at the left end of the slot 52 as shown, the connecting rod operates the actuating lever 48, causing it to withdraw the pinch roller 22 from the capstan and at the same time turn the latch lever 58*a* to release latch pin 50*a* and permit the spring 62*a* to turn lever 48*a* and bring the pinch roller 22*a* into contact with the capstan. This turning of lever 48*a* can take place because, the solenoid 55*a* being de-energised, the connecting rod 53*a* is in a position to the right of that shown in the drawing, which allows the pin 51*a* to travel along the slot 52*a* to its right hand end. As the pinch roller 22 is withdrawn from the capstan it disengages idler wheel 26 from spindle wheel 32. Also the latch pin 50 rides along the edge of latch lever 58 until it reaches and enters the detent 60 whereby the latch lever latches the pinch roller in disengaged position. Actuation of the connecting rod 53 at the same time turns the rocker arm 33 so as to bring the wheel 37 of spindle 14 into contact with the rim 39 of the flywheel 2, whereby the spindle 14 is driven at high speed from the flywheel for fast rewinding of the tape 18 on reel 16 from reel 17. Similarly as described with reference to rewinding on reel 16*a*, when rewinding on reel 16 is completed the solenoid 55 is de-energised to return the connecting rod 53 and rocker 33 to their positions shown, disengaging spindle 14 from the flywheel drive, and the brakes 64 and 65 are applied to stop the reels 16 and 17.

The solenoids 55, 55*a* may be arranged for operation automatically by contacts on the tapes so that as one tape completes its run for recording or playback the other tape (having already been threaded in position) is automatically started and takes over the recording or playback programme while the previous tape is automatically rewound. The brake solenoids may also be arranged for automatic operation by the return movements of the rocker arms disconnecting the respective spindles 14, 15, 14*a*, 15*a* from the high-speed drive from the flywheel 2.

Independent of the operation of the solenoids 55, 55*a*, each spindle 14, 15, 14*a* or 15*a* may be driven from the flywheel by operation of its actuating arm 44, 45, 44*a* or 45*a*, as already mentioned. This allows a tape which is in use in either tape path to be wound forwards or backwards at high speed, as may be required for rapid selection of a point on a tape at which to start recording or playback. In order to permit such operation the arms 47 and 47*a* of the rocker arms 34 and 34*a* are connected to pins 51 and 51*a* by links 70 and 70*a* respectively, these links being fixed at one end to the pins, the other ends of the links having slots 71 and 71*a* receiving pins 72 and 72*a* on the arms 47 and 47*a* respectively. If the pinch roller, say 22*a*, is not in contact with the capstan, which means that a tape is not being in use for recording or playback, when it is desired to wind the tape either fast forwards or fast backwards, either one of the actuating arms 44*a*, 45*a* may be operated to drive the spindle 14*a* (for fast rewind) or 15*a* (for fast forward wind) at high speed from the flywheel 2. However, if the pinch roller, say 22, is in contact with the capstan, which means that the tape is being driven for recording or playback, in order to enable fast forward or backward winding to be effected it is necessary for the pinch roller to be withdrawn from the capstan sufficiently to free the tape at that point. This is accomplished in the case of operation of the actuating arm 47 for fast drive of spindle 15 (for fast forward wind), by the link 70 drawing pin 51 to turn lever 48 just sufficiently to remove the pinch roller 22 from capstan 1 without releasing the latch 58*a* latching pinch roller 22*a*, the pinch roller 22 returning into contact with the capstan when the actuating arm 47 is released and the fast drive to spindle 15 is disengaged. In the case of operation of the actuating arm 46 for fast drive of spindle 14 (for fast backward wind), actuation of arm 46 will push connecting rod 53 and so push the pin 51 to turn lever 48 as before. Although connected to pin 51, the actuating arm 47 and hence the spindle 15 are not affected by the consequent movement of link 70 by the pin, owing to lost motion due to slot 71. As before, the pinch roller 22 returns into contact with the capstan when the actuating arm 46 is released and the fast drive to spindle 14 is disengaged. In either case, of course, the brakes 64 and 65 are applied momentarily in order to bring the spindles to rest. On return of the pinch roller into contact with the capstan the idler wheel 26 again takes up the drive to the spindle 15 and recording or playback may be effected or resumed.

I claim:

1. A tape deck for a magnetic tape recorder, comprising means defining one path including a take-up reel for a magnetic tape, electromagnetic transducer means associated with said tape path means, means defining a second path for a second magnetic tape and including a second take-up reel, electromagnetic transducer means associated with said second tape path means, a capstan common to both said tape paths for driving a magnetic tape in either path at constant speed past the respective one of said electromagnetic transducer means, a pinch roller associated with an idler wheel for each tape path and operable for bringing the respective tape into drive engagement with said capstan while establishing a drive train through its associated idler to the take-up reel in its respective path, and means for operating each of said pinch rollers and associated idler wheels.

2. A tape deck as claimed in claim 1, said capstan and said pinch rollers being arranged so that said capstan is adapted to drive one tape in one direction and the other tape in the opposite direction.

3. A tape deck for a magnetic tape recorder according to claim 1 wherein said means for operating said pinch rollers and associated idler wheels includes means for moving the pinch rollers simutaneously in opposite senses so that while one of said pinch rollers is in operative position for engaging a tape in the one tape path with said capstan the other of said pinch rollers is in inoperative position for disengaging a tape in the other tape path from said capstan, whereby said capstan may drive the two tapes alternatively.

4. A tape deck for a magnetic tape recorder according to claim 1 wherein said means for operating each of said pinch rollers and associated idler wheels includes means for controlling selective operation of said pinch rollers whereby to selectively engage either one or both of said tapes with said capstan.

5. A tape deck for a magnetic tape recorder according to claim 4 wherein said pinch rollers are disposed for engagement with said capstan respectively at circumferentially spaced points thereof whereby to effect a drive in one direction of a tape in one tape path and a drive in the opposite direction of a tape in the other tape path.

6. A tape deck for a magnetic tape recorder comprising, in combination, a pair of take-up reels, a capstan, means for rotating said capstan in one direction, two pinch rollers disposed for engagement with said capstan respectively at opposite ends of a diameter of said capstan, an idler wheel associated with each of said pinch rollers and take-up reels, means for guiding a tape between said capstan and one of said pinch rollers to one of said take-up reels, means for guiding a second tape between said capstan and the other of said pinch rollers to the other of said take-up reels, and means for moving each of said pinch rollers into and out of driven engagement with said capstan, while simultaneously engaging the associated idler wheel with the pinch roller and take-up reel.

7. A tape deck for a magnetic tape recorder comprising in combination, a capstan, means for rotating said capstan in one direction, two pinch rollers disposed for engagement with said capstan respectively at opposite ends of a diameter of said capstan, means for guiding a tape between said capstan and one of said pinch rollers, means for guiding a second tape between said capstan and the other of said pinch rollers, and means for moving each of said pinch rollers into and out of driven engagement with said capstan, said means for moving said pinch rollers including individual actuating means for each pinch roller and means coupling said actuating means to effect movement of said pinch rollers simultaneously in opposite senses whereby one is engaged with said capstan while the other is disengaged therefrom and vice versa.

8. A tape deck as claimed in claim 7, said means for moving said pinch rollers further including means for moving a disengaged one of said pinch rollers into engagement with said capstan, whereby to effect engagement of both said pinch rollers with said capstan at the same time.

9. A tape deck for a magnetic tape recorder including, in combination, a capstan, means for rotating said capstan in one direction, two pinch rollers disposed for engagement with said capstan respectively at opposite ends of a diameter of said capstan, spring means associated with each of said pinch rollers acting to urge the associated pinch roller into engagement with said capstan, an actuating lever associated with each pinch roller for withdrawing the pinch roller from engagement with said capstan and moving it to a disengaged position, means for operating each said actuating lever, a spring latch associated with each pinch roller for latching the pinch roller when in said disengaged position, means interconnecting said actuating lever of each pinch roller with said latch of the other pinch roller so that operation of the actuating lever of one pinch roller to cause that pinch roller to be latched unlatches at the same time the other pinch roller to allow it to move into engagement with said capstan under the action of its said associated spring means, means for guiding a tape between said capstan and one of said pinch rollers, means for guiding a second tape between said capstan and the other of said pinch rollers.

10. A tape deck as claimed in claim 9 in which said operating means for each actuating lever includes a solenoid.

11. A tape deck as claimed in claim 9 and including an actuating member for each said latch operable to withdraw the latch when latching a pinch roller to thereby release that pinch roller for engagement with said capstan independently of operation of the said actuating lever of the other pinch roller which is engaging said capstan meanwhile, whereby to enable both pinch rollers to engage said capstan at the same time.

12. A tape deck for a magnetic tape recorder including in combination a capstan, means for rotating said capstan in one direction, a pair of pinch rollers disposed for engagement with said capstan respectively at opposite ends of a diameter of said capstan, means for guiding a tape between said capstan and one of said pinch rollers, means for guiding a second tape between said capstan and the other of said pinch rollers, spring means for each pinch roller adapted to urge the pinch roller into engagement with said capstan, an actuating lever for each pinch roller operable for withdrawing the associated pinch roller from engagement with said capstan and moving the withdrawn pinch roller to a disengaged position, means including a solenoid for operating each said actuating lever, a spring latch for each pinch roller operable for latching the associated pinch roller when the same is in said disengaged position, means interconnecting said actuating lever of one pinch roller with said latch of the other pinch roller so that operation of the actuating lever of one pinch roller to cause that pinch roller to be latched by its said latch releases at the same time the said latch of the other pinch roller so as to unlatch said other pinch roller and thereby allow it to move into engagement with said capstan under the action of its associated spring means, said interconnecting means permitting partial operation of each actuating lever, independently of operation of its said solenoid, for withdrawal of the pinch roller associated with that said actuating lever from said capstan just sufficiently for releasing a tape between them for permitting a fast translation of the tape past said capstan but so that said partial operation of said actuating lever is insufficient to cause the withdrawn pinch roller to be latched and is insufficient to cause unlatching of the other pinch roller.

13. A tape deck as claimed in claim 12 and including an actuating member for each said latch operable to withdraw the latch when latching a pinch roller to thereby release that pinch roller for engagement with said capstan independently of operation of the solenoid operating the said actuating lever of the other pinch roller which is engaged with said capstan meanwhile, whereby to enable both pinch rollers to engage said capstan at the same time.

14. A tape deck for a magnetic tape recorder including in combination a capstan, means for rotating said capstan in one direction, a pair of pinch rollers disposed for engagement with said capstan respectively at opposite ends of a diameter of said capstan, means for guiding a tape between said capstan and one of said pinch rollers, means for guiding a second tape between said capstan and the other of said pinch rollers, a carrier for each pinch roller movable for moving the pinch roller carried thereby into and out of driven engagement with said capstan, a latch element on each said carrier, a spring latch for each pinch roller comprising a two-armed pivoted lever and associated spring means, one arm of said latch lever bearing under the action of its said spring means against said latch element and said one arm having a detent adapted to receive said latch element and thereby latch the pinch roller carried by said carrier when said pinch roller is in a disengaged position, a two-armed pivoted actuating lever for each pinch roller connected to said carrier thereof and operable for withdrawing said pinch roller from engagement with said capstan and moving it to said disengaged position, means for operating each said actuating lever comprising a solenoid and an operating member connecting said solenoid to the associated actuating lever and having a pin-and-slot connection to one arm of said actuating lever, the other arm of said latch lever of each pinch roller being positioned for engagement by the other arm of said actuating lever of the other pinch roller whereby to interconnect the latches and actuating levers so that the operation of the actuating lever of one pinch roller to cause the latter to be latched by its latch releases at the same time the latch of the other pinch roller to permit the latter to move into engagement with said capstan under the action of its associated spring means, the interconnection between the latches and actuating levers permitting partial operation of each actuating lever otherwise than by its solenoid, for withdrawal of the associated pinch roller from said capstan just sufficiently for releasing a tape between them for permitting a fast translation of the tape past said capstan but so that said partial operation is insufficient to move said pinch roller to said disengaged position and to be latched and is insufficient to cause unlatching of the other pinch roller, and means for effecting such partial operation of said actuating lever independently of its solenoid.

15. A tape deck for a magnetic tape recorder, including a capstan, means for rotating said capstan in one direction, twin pinch rollers associated with said capstan and each movable into and out of driven engagement with said capstan at opposite ends of a diameter of said capstan, means for guiding a tape between said capstan and one of said pinch rollers, means for guiding a second tape between said capstan and the other of said pinch rollers, twin pairs of spindles for receiving tape reels, each pair providing a spindle for a feed reel and a spindle for a take-up reel for one of the two tapes, and means for driving each take-up spindle from the associated pinch roller, each said drive means being responsive to the movement of the associated pinch roller so as to establish a driving connection between said pinch roller and take-up spindle when said pinch roller is engaged with said capstan and to disconnect said take-up spindle from said pinch roller when the latter is disengaged from said capstan, each said drive means being adapted to maintain a tension on the tape between its take-up reel and the point where the tape is pressed between the pinch roller and said capstan during recording and playback.

16. A tape deck for a magnetic tape recorder including, in combination, a capstan, drive means for rotating said capstan in one direction, twin pinch rollers movably disposed for engagement respectively with said capstan so as to be rotated thereby in opposite directions, actuating means for moving each of said pinch rollers in to and out of engagement with said capstan, a feed reel spindle and a take-up reel spindle associated with each of said pinch rollers, first spindle drive means for driving each take-up spindle from the associated pinch roller, first control means controlling each of said first spindle drive means in response to movement of the associated pinch roller for connecting and disconnecting the drive from the pinch roller to the take-up spindle on said actuating means moving said pinch roller into and out of engagement with said capstan respectively, second spindle drive means for driving each of said spindles individually from said capstan drive means, second control means controlling each of said second spindle drive means for connecting and disconnecting the spindle with said capstan drive means, and means interconnecting said first and second control means for each take-up spindle so that operation of said second control means thereof causes disconnection of the take-up spindle from the pinch roller drive before said second control means completes connection of said spindle to said capstan drive means.

17. A tape deck as claimed in claim 16 in which said capstan drive means include an electric motor and a capstan flywheel driven from said motor, each of said take-up spindles having a friction drive surface, and each of said pinch rollers having a friction drive surface, an idler friction drive wheel between each pinch roller and the associated take-up spindle, spring means maintaining said idler wheel in peripheral contact with said friction drive surface of said pinch roller, said idler wheel being adapted to be brought into and out of frictional driving contact with said friction drive surface of said take-up spindle under control of said first control means, each of said spindles having a second friction drive surface for peripherally contacting a rim of said flywheel under control of said second control means for driving the spindle from the flywheel at high speed as and when required for fast winding and rewinding operations.

18. A tape deck as claimed in claim 17 and including a movable carrier for each of said spindles, spring means for holding said spindle carrier in a normal position with said second friction drive surface of said spindle out of contact with said flywheel rim, and means for moving said spindle carrier against the action of its said spring means to bring said second friction drive surface into driven contact with said flywheel rim.

19. A tape deck for a magnetic tape recorder including the combination of a capstan, drive means for rotating said capstan in one direction, twin pinch rollers movably disposed for engagement with said capstan respectively at points thereof so as to be rotated in opposite directions by said capstan, means for guiding a tape between said capstan and one of said pinch rollers, means for guiding a second tape between said capstan and the other of said pinch rollers, twin pairs of tape reel spindles associated with said twin pinch rollers respectively, each pair providing a spindle for a feed reel and a spindle for a take-up reel for one tape, interconnected means for moving said pinch rollers into and out of driven engagement with said capstan and so as to effect movement of said pinch rollers simultaneously in opposite senses whereby said pinch rollers are engaged with said capstan alternatively, means for driving each of said feed reel spindles from said first-mentioned drive means, and control means for said spindle driving means connected with said means for moving said pinch rollers so that actuation of said last-mentioned means to disengage one pinch roller from and engage the other pinch roller with said capstan renders the one said driving means for the feed reel spindle associated with the disengaged pinch roller operative for driving that spindle from said drive means first mentioned.

20. A tape deck for a magnetic tape recorder including, in combination, a capstan, a flywheel for said capstan, means for rotating said capstan and said flywheel in one direction, twin pinch rollers movably disposed for engagement respectively with said capstan at spaced peripheral points thereof so as to be rotated thereby in opposite directions, means for guiding a tape between said capstan and one of said pinch rollers, means for guiding a second tape between said capstan and the other of said pinch rollers, twin pairs of spindles for receiving tape reels, each pair of spindles associated with one of said pinch rollers providing a spindle for a feed reel and a spindle for a take-up reel for one of the two tapes, spring means for each pinch roller acting to urge the pinch roller into engagement with said capstan, an actuating lever for each pinch roller operable for withdrawing the pinch roller from engagement with said capstan and moving the withdrawn pinch roller to a predetermined position, means for operating each said actuating lever comprising a solenoid and an operating member connecting said solenoid to the actuating lever through a lost-motion connection, a spring latch for each pinch roller operable for latching the pinch roller when the same is in said disengaged position, means interconnecting the said actuating lever of one pinch roller with the said latch of the other pinch roller so that operation of the actuating lever of one pinch roller to cause that pinch roller to be latched by its said latch releases at the same time the said latch of the other pinch roller to unlatch said other pinch roller and thereby allow it to move into engagement with said capstan under the action of its said spring means, a friction drive surface on each of said spindles for contacting a rim of said flywheel so as to drive the spindle from said flywheel, means pivotably mounting each spindle for movement thereof to bring said drive surface into and out of contact with said flywheel, spring means associated with said spindle mounting and normally holding said drive surface out of contact with said flywheel rim, means connecting said spindle mounting of each feed spindle with said operating member of said actuating lever of the associated pinch roller so that operation of said operating member by said solenoid as well as causing the actuating lever connected thereto to disengage the pinch roller from the capstan also moves the feed spindle mounting to bring said drive surface of the feed spindle into contact with said flywheel whereby to cause the feed spindle to be driven from the flywheel at high speed for fast rewinding on disengagement of the pinch roller from said capstan by operation of said solenoid, means coupling each of said take-up spindle mountings with said actuating lever of the associated pinch roller for moving said actuating lever sufficiently to disengage said pinch roller from said capstan if engaging the same when said take-up spindle mounting is moved to bring said drive surface of the take-up spindle into contact with said flywheel rim and to return the withdrawn pinch roller into engagement with said capstan when the take-up spindle is returned to normal position, actuating means for each spindle mounting, said coupling means including lost-motion connection which together with said lost-motion connection first mentioned are adapted to prevent transmission of movements of either one of a pair of feed and take-up spindles to the other of said pair.

References Cited in the file of this patent

UNITED STATES PATENTS 2,805,862 Soubrier -------------- Sept. 10, 1957